May 29, 1923.
T. NEWMAN
SHOVEL ATTACHMENT
Filed Aug. 7, 1922
1,456,879
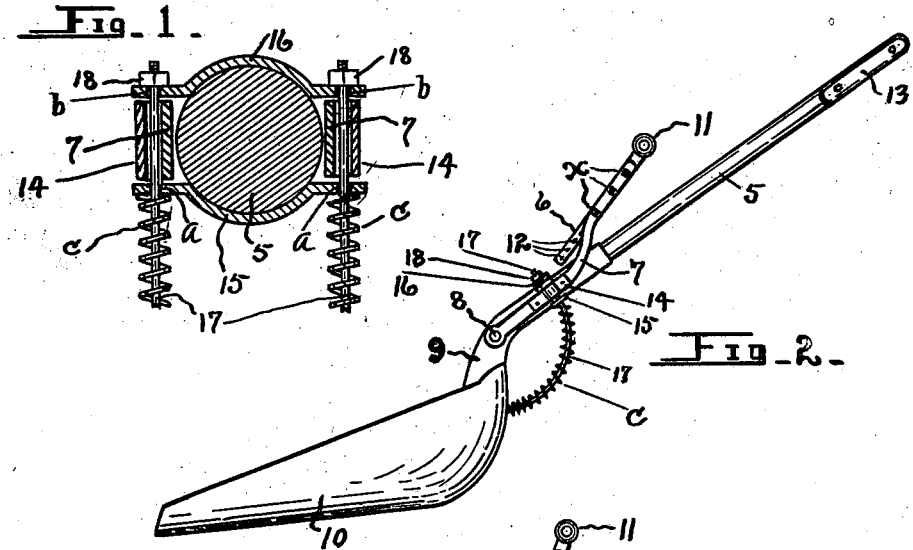
Fig. 1.
Fig. 2.
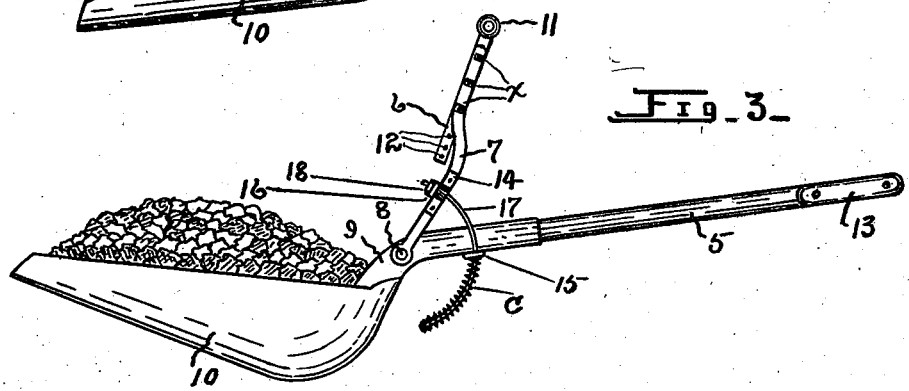
Fig. 3.
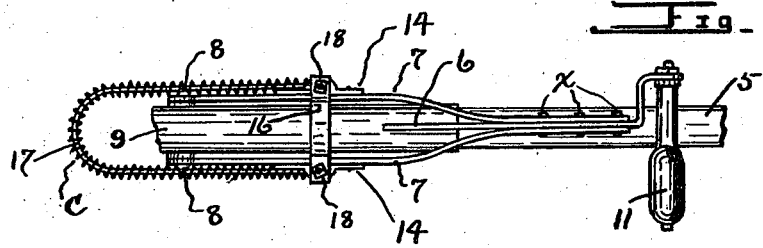
Fig. 4.
Inventor
Thomas Newman
By Hiram A. Sturges
Attorney Patented May 29, 1923.

1,456,879

UNITED STATES PATENT OFFICE.

THOMAS NEWMAN, OF OMAHA, NEBRASKA, ASSIGNOR OF ONE-HALF TO VERNON B. SMITH, OF OMAHA, NEBRASKA.

SHOVEL ATTACHMENT.

Application filed August 7, 1922. Serial No. 580,126.

*To all whom it may concern:*

Be it known that I, THOMAS NEWMAN, a citizen of the United States, residing at Omaha, in the county of Douglas and State of Nebraska, have invented certain new and useful Improvements in a Shovel Attachment, of which the following is a specification.

This invention relates to an attachment useful in connection with manually operated implements requiring swinging and lifting movements, and of particular advantage when applied to scoop shovels. One of the objects of the invention is to provide a pivotally mounted lifting-bar for the handle of a shovel or similar implement so that an operator when using it may assume a less stooping position than ordinary. Another object is to provide resilient means normally causing the bar to move rearwardly toward the handle, for convenience in operation. Still another object is to provide a pivotal mounting for the bar near the load to be lifted and nearer to the blade or bowl of the implement than that part of the handle usually grasped by the hand of an operator, to facilitate operation. The invention includes a lifting-bar provided with a hand-piece and having divergent arms, together with certain adjustable features found to be of advantage and fully explained herein. Another object of the invention is to provide an attachment which will consist of few and simple parts so that it may be manufactured economically, will be durable, and may be conveniently applied to shovels or similar implements.

In the accompanying drawing which illustrates the invention, Fig. 1 is a sectional view through the handle of an implement and arms of a lifting-bar to clearly show the mounting of a segmental spring-support or loop. Fig. 2 is a side view of a scoop shovel provided with the attachment, the spring being retracted and the lifting-bar disposed in a normal position. Fig. 3 is a side view of the same, the lifting-bar being swung upwardly and the spring being contracted. Fig. 4 is a plan view showing a part of a handle with the device mounted thereon.

Referring now to the drawing for a more particular description, numeral 5 indicates the handle of a scoop shovel, and in order that operation may be facilitated, I provide an attachment consisting, in part, of a lifting-bar 6 which includes a pair of divergent arms 7 having a pivotal mounting 8 upon the shank 9, closely adjacent to the bowl or blade 10 of the shovel, said bar 6 having a holder element 11 at its free end, and being provided at longitudinal intervals with numerous apertures 12 for use in removably connecting the arms therewith, by means of keepers $x$.

As thus described, an operator may grasp the holder element 11 of the bar and the hand-piece 13 of the handle 5 for operating the shovel, and the work will be more convenient and less laborious than usual, since the hands and arms of an operator may remain further from the ground, and the extreme stooping or leaning position over the work, usually experienced, will not be required, the lifting-bar together with its arms, having a swinging movement from the pivot 8; and since the pivotal mounting 8 is on a part nearer to the load to be lifted than is usually grasped by the hand of an operator, the load may be lifted with greater facility than ordinary. The lifting-bar and its arms may be adjusted so that a greater or lesser length may be provided, the keepers $x$ being adapted to engage in any of the apertures 12 which may be selected, after the arms 7 have been moved longitudinally of the bar 6.

It will be noted that the holder 11 projects outwardly of the side of the handle 5, this being a matter of convenience, and by referring to Fig. 4 it will be seen that the device may be adjusted for the use of a "right handed" or "left-handed" operator, since the bar 6 is rectilinear and may be reversed; the keepers $x$ being removed for this purpose and the bar swung a half circle so that member 11 will project from the side of the handle 5, opposite to that shown in Fig. 4.

The parts thus described may be used to advantage in many instances when applied to forks, shovels or similar implements, but for use when heavy material is to be moved, resilient means are employed, and now to be described, said means operating to resist a swinging movement of the bar 6 outwardly from the handle 5, and normally causing it to swing toward the handle after it has been forcibly swung outwardly therefrom.

Each arm 7 of the lifting-bar 6 is provided, adjacent to its pivotal mounting 8, with a staple-plate 14. At 15 is indicated a bearing-plate, best shown in Fig. 1, said plate, near its ends, being provided with apertures $a$ and adapted to engage the lower side of the handle 5. At 16 is indicated a bearing-plate having apertures *b* and adapted to engage the upper side of said handle and the arms 7.

Numeral 17 indicates a curved rod or loop upon which is mounted a spiral spring *c*, the arms of said loop being of segmental form and each having an end-portion traversing a staple-plate of an arm 7, an aperture *a* and an aperture *b* of the respective bearing-plates 15 and 16, nuts 18 being threaded on the ends of the loop.

Since the arms of the loop are of segmental form the loop will not be obtrusive in use, but normally, will lie closely adjacent to and may engage the rear part of the shovel, as shown in Fig. 2, and since the curved arms of the loop are equidistant from the pivotal mounting 8 of the arms 7 of the lifting-bar, they will not cause appreciable friction while moving through the staples and apertures of the bearing-plates.

It is obvious that an operator, by use of the hand-holds 11 and 13, may lift a load without excessive stooping or bending. During this operation the lifting-bar will gradually swing outwardly from the handle 5 against the force of the spring *c*, the plate 15 being pressed by the spring against the handle 5; and after the load is discharged from the shovel, the bar 7 will swing toward the handle by force of the spring, ready for another operation.

While I have described details of construction I do not wish to be understood as limiting myself in this respect, and changes in form, size, proportion and minor details may be made as found to be of advantage, said changes being within the scope of the invention as claimed.

I claim as my invention,—

1. In an attachment for an implement having a handle, a lifting-bar pivotally mounted on said handle, and resilient means connected with the lifting-bar and handle and actuated by a swinging movement of said bar for resisting a movement of the bar in one direction.

2. In an attachment for an implement having a handle, a pair of arms pivotally mounted on opposed sides of the handle and extending convergingly therefrom, a bar adapted to be swung transversely approximately a half circle to be disposed between said arms in the plane of the handle, a holder-element disposed transversely of and secured to said bar, and adjustable means for maintaining the bar stationary with said arms after said bar and the holder-element have been swung in a circle's arc transversely of said arms.

3. In an attachment for an implement having a handle, a pair of arms pivotally mounted on opposed sides of the handle and extending convergingly therefrom, a bar having numerous apertures and provided with a holder-element and adapted to be disposed between said arms in the plane of the handle, keepers traversing the arms and adapted to engage in selected apertures of the bar to permit said bar to be adjusted longitudinally of said arms.

4. In an attachment for an implement having a handle, a lifting-bar pivotally mounted on the handle and provided at its free end with a holder-element, a bearing-plate on the handle, a second bearing-plate on the bar, a loop traversing the first named bearing-plate and secured to the second bearing-plate, and a spring on the loop in engagement with the first named bearing-plate for resisting a swinging movement of the bar in one direction.

5. In an attachment for an implement having a handle, a bearing-plate on the handle, a curved rod traversing the bearing-plate and secured to the lifting-bar, and resilient means on said rod engaging the bearing-plate for resisting a swinging movement of the bar in one direction.

6. In an attachment for an implement having a handle, a lifting-bar pivotally mounted on the handle, a loop secured to the lifting-bar and having segmental arms disposed equi-distant from the pivotal mounting of said bar, a bearing-plate traversed by the loop, and a spring on the segmental arms of the loop adapted to press the bearing-plate into engagement with the handle and to resist a movement of the lifting-bar when the latter is moved in one direction on its pivotal mounting.

7. In an attachment for an implement having a handle, a lifting-bar having a pair of arms pivotally mounted on opposed sides of the handle, a bearing-plate on said arms, a loop secured to the bearing-plate and having segmental parts disposed equi-distant from the pivotal mounting of the arms of said bar, a second bearing-plate traversed by the segmental parts of the loop, and a spring carried by the loop adapted to press the second bearing-plate against the handle and to resist a movement of the lifting-bar when said bar is swung in one direction.

In testimony whereof, I have affixed my signature in presence of two witnesses.

THOMAS NEWMAN.

Witnesses:
  HIRAM A. STURGES,
  ARTHUR H. STURGES.